United States Patent [19]

Timms et al.

[11] 4,280,595

[45] Jul. 28, 1981

[54] POSITIVE BRAKE FOR A VEHICLE WHEEL

[75] Inventors: Rayford W. Timms, St. Louis; Raymond C. Waidmann, Cedar Hill, both of Mo.

[73] Assignee: American Air Filter Company, Inc., Louisville, Ky.

[21] Appl. No.: 106,465

[22] Filed: Dec. 26, 1979

[51] Int. Cl.³ .............................................. B60T 1/06
[52] U.S. Cl. ........................................ 188/31; 74/529; 188/69
[58] Field of Search ............... 188/31, 60, 69, 20, 188/21, 22; 74/527, 529

[56] References Cited

U.S. PATENT DOCUMENTS

| 2,452,089 | 10/1948 | Wiken et al. | 188/69 |
| 3,226,999 | 1/1966 | Allison | 74/527 |

FOREIGN PATENT DOCUMENTS

| 590532 | 1/1960 | Canada | 74/527 |
| 504746 | 4/1920 | France | 188/31 |
| 1930 | of 1909 | United Kingdom | 188/31 |
| 823372 | 11/1959 | United Kingdom | 188/31 |

Primary Examiner—George E. A. Halvosa
Attorney, Agent, or Firm—Thomas G. Anderson

[57] ABSTRACT

A hand brake for a wheeled vehicle comprises an operating shaft carried within a sleeve affixed to the frame of the vehicle to accommodate axial displacement and rotation of the shaft attendant to shifting the brake between respective braking and non-braking positions. A locking lug on the shaft is adapted to engage and secure a receiving member mounted on one of the vehicle wheels upon rotational and axial movement of the shaft into the braking position, and stops on the shaft cooperative with the sleeve to releasably secure the shaft in the respective braking and non-braking positions.

8 Claims, 6 Drawing Figures

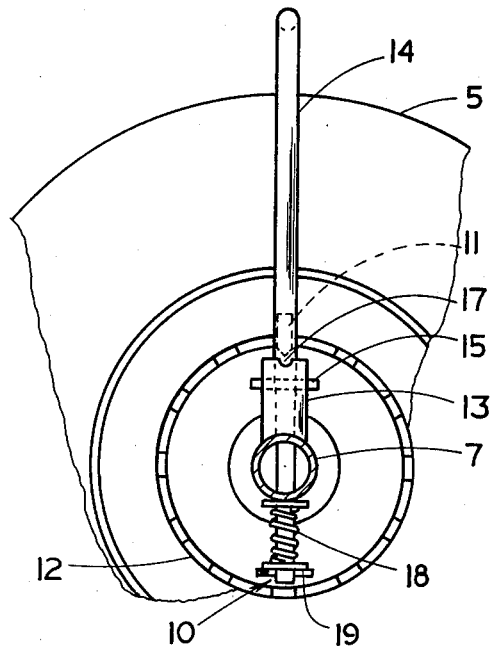
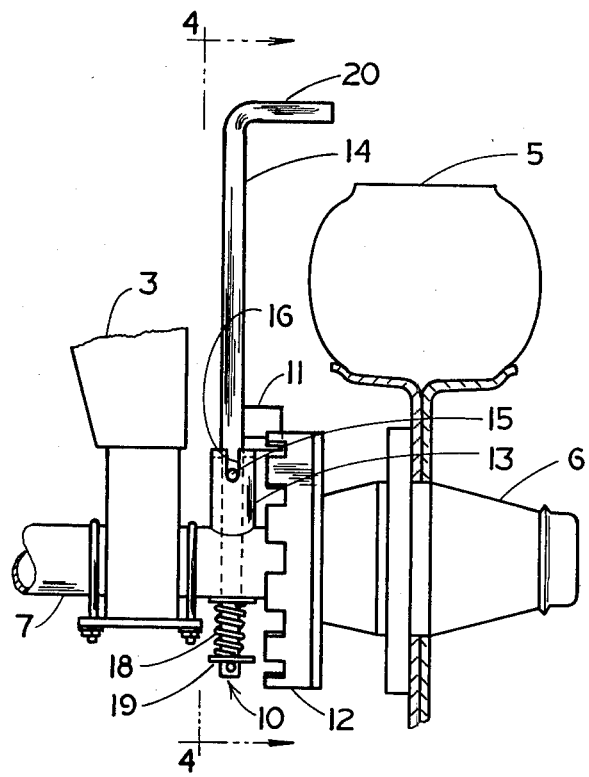
FIG. 4   FIG. 3
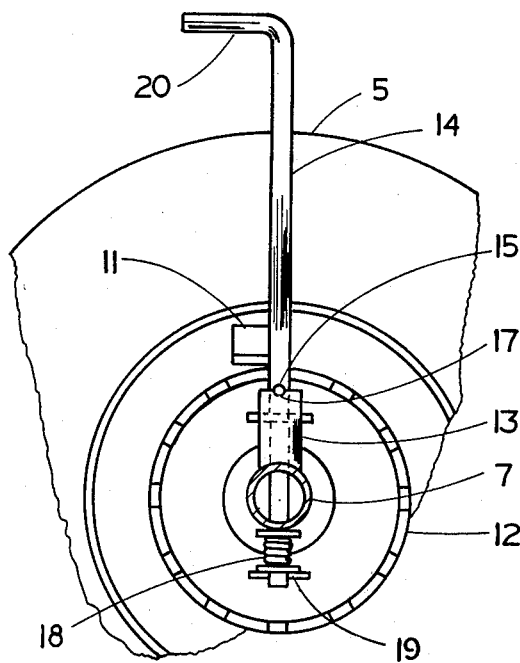
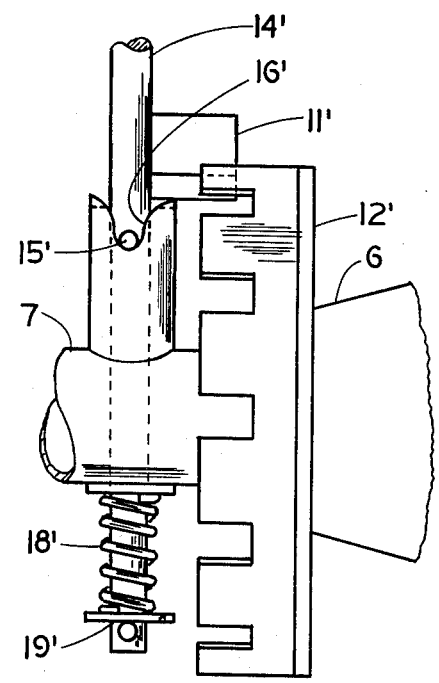
FIG. 5   FIG. 6

POSITIVE BRAKE FOR A VEHICLE WHEEL

BACKGROUND OF THE INVENTION

1. Field of Invention

The present invention relates to vehicle wheel brakes and in particular to a braking arrangement for equipment trailers such as those used to transport portable heaters and the like.

2. Description of the Prior Art

Equipment trailers such as those used by the military to transport field heating units for living quarters, mess halls, and maintenance facilities, as well as aircraft ground support equipment and related applications, are generally subjected to relatively harsh treatment due to transport over rough terrain, extended exposure to the elements, and the difficulty of completing routine maintenance in the cold or arctic climates where the heaters are used. Thus, while the components of such trailers must be of a relatively lightweight construction to enhance their mobility in the field, they likewise should be of a durable yet easily fabricated design to simplify field service and repair.

When one of the heating units is put into service, it has usually been necessary to secure the trailer in place to prevent it from moving about due to vibrations incident to heater operation. One method of doing this has been to wedge calking blocks or the like against the wheels of the trailer. Another and generally preferred method has been to provide a mechanical or drum type brake on one of the wheels which can be secured by an operator to lock the wheels in position. However, the relative complexity of this type of arrangement requires frequent cleaning and repair which is often difficult to accomplish or simply overlooked in cold weather. Moreover, if a cold and hurried tractor operator fails to disengage the wheel brake prior to towing the trailer, both the brake and the wheel are subject to damage.

SUMMARY OF THE INVENTION

The present invention relates to vehicle wheel brakes and in particular to a braking arrangement for equipment trailers such as those used to transport portable heaters and the like.

The braking arrangement includes an operating shaft secured to the frame of the vehicle by a stationary sleevelike mounting member adjacent one of the vehicle wheels. The shaft, which is journaled within the mounting member to accommodate axial displacement of the shaft by a workman attendant to shifting the brake between wheel braking and non-braking positions, includes a projecting lug engageable with a receiving member on the wheel to lock it in the braking position, and, upon axial displacement and rotation of the shaft to the non-braking position, the lug is withdrawn from the receiving member to release the wheel.

As the lug moves into engagement with the receiving member, projecting stops on the shaft are releasably entrained in slots provided in the mounting member to secure the shaft against rotation. Under normal conditions the stops retain the shaft and the projecting lug in the braking position. However, in the event of excessive and otherwise damaging torsional loads on the shaft such as occur when an operator tows the vehicle with the brake in the locked position, the stops cooperate with the mounting member to disengage the brake.

From the foregoing, it can be seen that the braking arrangement embodying the invention is of a lightweight and easily fabricated design which is simple to operate and requires minimal maintenance in the field, it being understood that various changes can be made in the arrangement, form and construction of the apparatus disclosed herein without departing from the scope and spirit of the invention.

DESCRIPTION OF THE DRAWINGS

FIG. 3 is a transverse cross-sectional view of the braking arrangement shown in FIG. 2;

FIG. 4 is a cross-sectional view taken generally along line 4—4 in FIG. 3;

FIG. 5 is a cross-sectional view similar to FIG. 4 showing the braking arrangement in the disengaged or non-braking position; and FIG. 6 is a further enlarged transverse cross-sectional view similar to FIG. 3 showing an alternative embodiment.

DESCRIPTION OF THE PREFERRED EMBODIMENT

Figure 1:
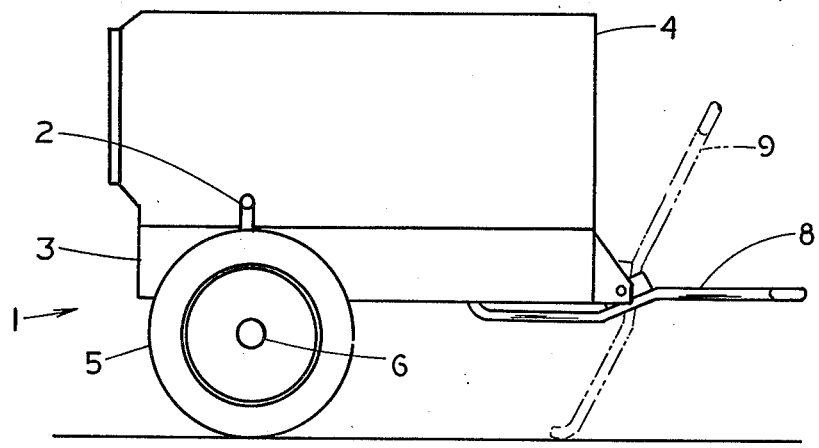
FIG. 1 is a side elevational view of an equipment trailer embodying the braking arrangement of the present invention.

Referring to the drawings, FIG. 1, shows an equipment trailer 1 incorporating a braking arrangement 2 embodying the present invention. The trailer 1 includes a frame 3, a forced air heater enclosed within a housing 4, and a pair of wheels 5 which are pivotally secured by conventional wheel hubs 6 to a stationary axle 7 affixed to the trailer frame 3. Additionally, a towbar 8 similar to that provided in the trailer arrangement disclosed in U.S. Pat. No. 4,063,750 is secured to the trailer frame 3, it being noted that the towbar 8 can be manipulated between the horizontal towing position shown by the solid lines in FIG. 1 and the trailer supporting or parking position as indicated by the phantom lines at 9.

Figure 2:
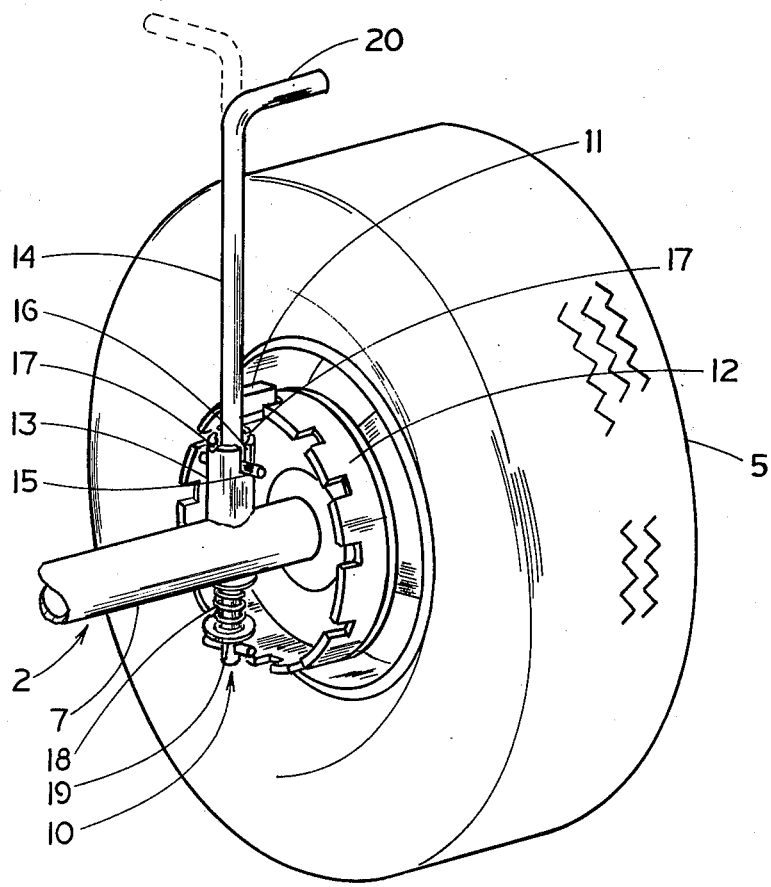
FIG. 2 is an enlarged partial isometric view of the braking arrangement shown in FIG. 1 viewed from the rear of the trailer.

As shown in FIGS. 2–5, the braking arrangement 2 includes a spring biased latching mechanism 10 including a projecting lug 11 engageable with the teeth of a sprocket-like cylindrical collar or receiving member 12 coaxially mounted on one of the wheel hubs 6 by welding, machine screws or other appropriate means. The latching mechanism 10 includes a tubular sleeve or mounting member 13 rigidly secured to the axle 7, and an operating shaft 14 positioned to extend through the sleeve and the axle along an axis extending generally perpendicular to the rotational axis of the wheel. The shaft 14, which carries the normally projecting lug 11, is journaled within the sleeve to accommodate axial displacement and rotation of the shaft attendant to engaging and disengaging the lug 11 from the receiving member 12. As shown in FIGS. 2–4, the lug 11 is secured in the engaged or wheel braking position by a pair of projecting stops or pins 15 on the shaft 14 which are releasably entrained in the slots 16 provided in the end of the sleeve 13, and conversely, in the disengaged or non-braking position shown in FIG. 5 the pins 15 are releasably entrained in the notches 17. Additionally, the arrangement is provided with a compression spring 18 secured about the shaft 14 between the axle 7 and the pin and washer arrangement 19 affixed to the end of the shaft which urges the pins 15 into constant engagement with the slotted end of the sleeve.

From the foregoing, it can be seen that when an operator wants to engage the brake he simply rotates the projecting handle 20 on the shaft 14 until the pins 15 are aligned with the slots 16 whereupon the shaft is drawn into the sleeve by the spring to move the lug into engagement with the teeth of the receiving member. In this regard, it should be noted that as the lug 11 moves into engagement with the toothed cylindrical rim of the receiving member 12, it acts to punch out encrusted ice or dirt which may have accummulated between the teeth. This self-cleaning feature of the arrangement effectively assures complete engagement of the brake. Moreover, the normally projecting handle 20 not only provides the operator leverage for manipulating the brake, but it is also dimensioned to overlie and traverse the wheel in the braking position to readily indicate to the operator when the brake is engaged.

When it is desired to disengage the brake, the foregoing procedure is simply reversed. However, in the event a tractor operator attempts to tow the trailer with the brake engaged, the invention also contemplates an arrangement wherein the brake is automatically disengaged to prevent damage to the wheel. Specifically, as shown in the alternative embodiment of FIG. 6 wherein elements similar to those of the foregoing embodiment are identified by the same numerals having a prime designation, V-shaped camming slots 16' are provided to retain the pins 15' in lieu of the slots 16 provided in the first embodiment. In this arrangement, the biasing force of the spring 18' normally retains the pins 15' in the V-shaped slots 16' to secure the brake in the engaged position; however, if the trailer is towed with the brake so secured the receiving member 12' reacts with the lug 11' to overcome the biasing force of the spring 18' and rotate the shaft 14' which is guided into the disengaged position by the pins 15' tracking along the camming surfaces of the slots 16'.

We claim:

1. A braking arrangement for a vehicle wheel rotatably mounted on the axle of a wheeled vehicle, comprising:
   receiver means affixed to the vehicle wheel;
   stationary mounting means spaced from said receiver means along the axis of the wheel affixed to one side of the axle;
   an operating shaft extending through the axle carried by said mounting means, said mounting means accommodating movement of said shaft along and rotationally about its axis attendant to shifting the brake between respective braking and non-braking positions;
   lug means on said shaft extending from the periphery thereof perpendicularly to the axis of the shaft and being engageable with said receiver means to arrest rotation of the wheel upon rotational and axial movement of the shaft into the braking position and disengageable with said receiver means upon rotational and axial movement of the shaft into the non-braking position;
   biasing means mounted on the side of the axle opposite said mounting means urging said shaft toward the braking position; and
   retaining means releasably securing said shaft in the respective braking and non-braking positions.

2. The invention according to claim 1, and
   said shaft extending through said mounting means along an axis extending generally perpendicular to the rotational axis of the wheel.

3. The invention according to claim 1, and
   said shaft having a normally projecting handle portion dimensioned to overlie said wheel in the braking position of the shaft.

4. The invention according to claim 1, and
   said receiver means being a toothed sprocket-like member; and
   said lug means being engageable with the teeth of said sprocket.

5. The invention according to claim 1, and
   said receiver means being a generally cylindrical member having a toothed rim portion mounted coaxially with the wheel; and
   said lug means engaging the teeth of said rim portion and extending therethrough upon movement of the shaft into the braking position.

6. The invention according to claim 1, and
   said mounting means being a tubular sleeve-like member, said member having a plurality of axially opening notches spaced about the periphery of one of its ends; and
   said retaining means including projecting pin means on said shaft, said pin means being receivable in said notches to selectively retain the shaft in the respective braking and non-braking positions.

7. The invention according to claim 1, and said mounting means including a slotted connecting portion; and
   said retaining means including stop means on said shaft receivable in said slotted portion to secure the shaft against rotation in the braking position.

8. The invention according to claim 7, and
   said slotted portion including camming means operatively associated with said stop means to rotate the shaft and move it outwardly to shift the shaft to the non-braking position upon predetermined torsional loading on the shaft incident to movement of the vehicle with the brake in the braking position.

* * * * *